United States Patent Office 3,443,977
Patented May 13, 1969

3,443,977
ANTICORROSION PIGMENTS
Leonard M. Bennetch, Bethlehem, Pa., assignor to Chas. Pfizer & Co., Inc., New York, N.Y., a corporation of Delaware
No Drawing. Continuation-in-part of application Ser. No. 471,746, July 13, 1965. This application Nov. 13, 1967, Ser. No. 682,626
Int. Cl. C09c 1/34
U.S. Cl. 106—302                5 Claims

ABSTRACT OF THE DISCLOSURE

Metal phosphate compositions useful as pigments are prepared by oxidizing a soluble ferrous salt with a soluble chromate salt in the presence of phosphate ions. These pigments are then used in coating compositions to inhibit corrosion of ferrous metal surfaces.

CROSS REFERENCE TO RELATED APPLICATIONS

This application is a continuation-in-part of application Ser. No. 471,746, filed July 13, 1965, now abandoned.

Background of the invention

This invention concerns new anticorrosion pigment compositions and, more particularly, pigment compositions containing iron, in the ferric state, chromium, in the chromic state, sodium, phosphorous and oxygen. These pigment compositions show unexpected anticorrosion properties when they are included in standard paint, enamel and lacquer formulations and applied to ferrous metal surfaces. They are shown to be particularly effective in alkyd and epoxy primer surfacers and highway maintenance primers and topcoats. This invention also contemplates a process for preparing these pigment compositions.

U.S. Patent No. 2,749,214 issued on June 5, 1956 to Arnold J. Eickhoff, et al. claims a process for preparing insoluble chromic phosphates which are disclosed as possessing valuable pigmentary and corrosion resistant properties. U.S. Patent No. 2,227,928 issued on Jan. 7, 1941 to Julius Drucker claims compositions of matter comprising a binding agent and ferrous-ferric phosphate pigments. These patents describe pigments of definite crystalline structure while the anticorrosion pigment compositions of this invention are amorphous. In addition, my compositions while containing iron, chromium and phosphorous, are cheaper to make than either the chromic phosphates of the Eickhoff patent or the ferrous-ferric phosphates of the Drucker patent. My compositions contain 6 or 7% of the expensive chromium while the Eickhoff pigments contain about 20% chromium. Furthermore, my process for producing these new pigment compositions is simple and inexpensive to run. It does not require high temperatures and high pressures, along with the attendant high pressure equipment that the Drucker patent discloses. Surprisingly, my inexpensive pigment compositions give anticorrosion properties to coatings applied to ferrous metal surfaces even though they contain a sodium content expressed for analysis as up to 13.10% $Na_2O$. Corrosion is defined as the deterioration of a substance, particularly metals because of a reaction with its environment. In regard to industrial finishes, the causative agent is usually water either in the form of moisture in the air, rain or water from lakes, rivers and oceans. Most of the water contains auxiliary corrosion causing agents in the form of dissolved salts, acids and gases, such as sodium chloride, hydrochloric acid, oxygen, sulfur dioxide, carbon dioxide and the like. The two general methods for preventing the corrosion of metals are: painting and overcoating with less-corrosive metals and salts. Of these two, the use of coatings either as a paint or a "wash-primer" is less expensive to apply and to maintain than coating the metal surface with corrosion resistant metals.

The use of phosphates over iron or steel is well known. Zinc, iron and manganese phosphates have been used as heavy coatings obtained by dipping iron and steel panels in phosphate salt solutions or phosphoric acid. The retardation of corrosion of metal by phosphate ion is believed to be due to the blocking of anodic areas of the metal with deposits of iron phosphate, zinc phosphate or manganese phosphates. When phosphate coatings are desired primarily for corrosion protection of iron and steel, long contact-times with phosphoric acid mixtures are required at elevated temperatures. A marine primer was developed during World War II which consisted of a vinyl resin, a zinc chromate pigment and phosphoric acid. This primer gave effective corrosion protection to ship bottoms.

In addition to these methods it is also well known that rust remover solutions may contain soluble chromates, phosphates, iron phosphates, zinc salts and phosphoric acid. In this method, after the rust is removed by the action of the solution, the surface is protected by the reaction of the iron surface with the phosphoric acid in the rust-remover solution. Other methods of reacting the iron in a metal surface with phosphoric acid are also well known. For example, zinc, manganese or iron dihydrogen phosphate salts may be dissolved in water to give a strongly acid solution which reacts with an iron surface to form an iron phosphate coating. Another method consists in dispersing a metal powder such as aluminum in an acidic solution containing phosphate and chromate ions, spraying or dipping the metal to be protected in the mixture and then heat curing the metal. In this way the metal powder forms the protective coating and no organic paint vehicles are required.

The product of this invention gives corrosion-resistant properties to ferrous metals without dipping or washing in chemical solutions but by the inclusion of a solid, particulate pigmentary composition containing ferric iron, chromic chromium and phosphorous in the paint vehicles. The pigment forms a continuous, insoluble and oxidation-resistant film on metal surfaces which is inexpensive to apply and to maintain.

Coating formulations containing the pigment compositions of this invention resist blistering and rusting when applied to iron and steel surfaces. They are equivalent in performance to standard anticorrosion pigments.

SUMMARY OF THE INVENTION

This invention is a process for producing an amorphous pigment composition which comprises reacting a soluble ferrous salt with sufficient soluble chromate salt to oxidize substantially all of the ferrous ions to ferric ions, in acid solution of pH from about 1 to 3 containing phosphate ions, and thereafter adjusting the final pH of the mixture with sodium hydroxide to a value higher than the pH at which the reaction was run and from about 1.5 to 8.

This invention is also the above-described process where the final pH is adjusted to from about 3 to 8 with sodium hydroxide and also the process where the soluble ferrous salt and the soluble chromate salt are reacted at a temperature of from about 50° C. to 90° C. More particularly, it is the process where the ferrous salt is ferrous sulfate and the chromate salt is sodium dichromate.

Furthermore, this invention is the anticorrosion pigment composition consisting of from about 18 to 21 weight percent of iron in the ferric state, from about 6 to 7 weight percent of chromium in the chromic state, from about 0.7 to 10 weight percent of sodium, from about 15 to 16 weight percent of phosphorus, oxygen and from about 16 to 21 weight water.

DETAILED DESCRIPTION OF THE INVENTION

The compositions of this invention are prepared, by oxidizing a water-soluble ferrous salt such as ferrous sulfate or ferrous chloride with a water-soluble chromate salt. The preparation of these pigments is conducted in acid solution and in the presence of phosphate ions. The precipitation of the composition is brought to completion by the addition of sodium hydroxide to bring the pH of the reaction mixture to a range of from 1.5 to 8. The pigment composition is filtered, washed and dried.

In connection with a more detailed consideration of the process for preparing the compositions of this invention, a soluble ferrous salt, preferably a salt such as ferrous acetate, ferrous bromide, ferrous chloride, ferrous ferricyanide, ferrous fluoride, ferrous formate, ferrous nitrate, ferrous potassium oxalate, ferrous sulfate, ferrous thiocyanate or ferrous thiosulfate is oxidized with a stoichiometric amount of a soluble chromate salt generally one selected from the group comprising chromium trioxide, ammonium chromate, ammonium dichromate, sodium chromate, sodium dichromate, lithium chromate, lithium dichromate, potassium chromate and potassium dichromate in acid media and in the presence of phosphate ions. A preferred method consists in oxidizing ferrous sulfate in aqueous solution with sodium dichromate in aqueous solution in the presence of phosphate ions. The preferred method of acidifying the reaction mixture comprises using phosphoric acid, thereby supplying the phosphate ions and reducing the acidity to the preferred level of about pH 1 to about pH 3 in the same step. However, other acids such as hydrochloric and sulfuric acid can be used in conjunction with soluble phosphate salts to lower the pH to the preferred levels. Among the soluble phosphate salts which can most conveniently be used are salts such as monobasic and dibasic ammonium phosphates, ammonium metaphosphate; monobasic, dibasic and tribasic potassium phosphates, potassium pyrophosphate; monobasic, dibasic and tribasic sodium phosphates and sodium metaphosphate. The reaction mixture is stirred rapidly during the addition of the aforementioned salts and acid. The reaction proceeds at temperatures from about room temperature to 100° C. and preferably between about 50° C. and 90° C. to make the reaction take place at a fast, economical rate. For economy and convenience in handling tank vapors, the operating temperature is held below the boiling point of water. The precipitation of the green pigment composition begins when the redox reaction is complete and at a pH above 1. The precipitation is conducted in the presence of sodium ions. The sodium ions are preferably added as solid sodium hydroxide or an aqueous solution of sodium hydroxide so that the final pH is adjusted to from about 1.5 to 8 in one step. When the reaction is carried out at a pH of over 1 and up to 3, sodium hydroxide is added to raise the pH to a value higher than the reaction pH and from about 1.5 up to 8. As will be exemplified the final pH of the reaction mixture determines the amount of sodium that will be present in the pigment composition. It is preferred to precipitate the pigment at a pH of from about 3 to 8 in order to precipitate all of the chromium added to the reaction mixture. On the basis of economy and availability ferrous sulfate and sodium dichromate are the preferred reactants. The reaction time varies with the size of the reaction. Generally from 1 to 3 hours are preferred for laboratory size batches. However, even in production plant runs, the precipitation is rapid and is completed in several hours. The product of the reaction is then filtered, washed with water and dried by conventional methods which are familiar to those skilled in the art. The pigment is preferably dried at from 200 to 250° F., either in a pan drier or a belt drier. A pan drier is preferred if the precipitate is in the form of a filter cake. The belt drier is used in conjunction with a continuous production filter. When no filter is used, the pigment is obtained by the use of a spray drier.

The precipitates obtained from the process described are obtained in fine particle size after being filtered from the reaction, washed and dried. However, the filter cake contains pigment agglomerates which may require grinding before use. The methods for grinding pigments are well known to those skilled in the art. We have found the use of a beater mill, such as a micropulverizer, to be particularly useful in grinding the pigments of this invention.

The pigments are incorporated into binders such as alkyd, epoxy, vinyl, urethane, phenolic and urea resins as well as into lacquer bases by ball-milling, stone-milling, roller-milling or other milling and dispersing techniques which are familiar to those skilled in the art. The steel ball mill is particularly well suited for the large scale production of coatings. The pigment and binder are added to the mill without previous mixing and are revolved until the desired degree of dispersion is obtained. When a very viscous pigment and binder mixture is dispersed, a Banbury mixer or a two-roll rubber mill is generally preferred.

Example I.—Alkyd automotive primer

To a 4-liter beaker equipped with a mechanical stirrer is added 500 ml. of water containing 61 ml. of 85.3% phosphoric acid, 300 ml. of an aqueous solution of 125 grams $FeSO_4 \cdot 7H_2O$ and 100 ml. of an aqueous solution containing 22.3 grams $Na_2Cr_2O_7 \cdot 2H_2O$. The mixture is stirred rapidly, diluted to 1500 ml. with water and heated to 70° C. A 5% aqueous sodium hydroxide solution is added to the reaction mix at the rate of 5 ml. per minute until a total of 41 grams of sodium hydroxide are added. The acidity of the reaction after alkali addition is pH 3.0. The resulting precipitate is filtered, washed with water and dried. The yield is 140 grams.

No X-ray or electron diffraction patterns were obtainable on the dried product indicating that it is an amorphous composition. Chemical analysis of the product gave the following results:

|  | Percent |
| --- | --- |
| $Fe_2O_3$ | 26.70 |
| $CR_2O_3$ | 8.00 |
| $Na_2O$ | 9.32 |
| $P_2O_5$ | 36.09 |
| Ignition loss | 19.86 |
|  | 99.97 |

The pigment composition prepared according to this procedure was added to an alkyd automotive primer according to the following formula:

|  | Pounds | Gallons |
| --- | --- | --- |
| Mill charge: |  |  |
| Barytes | 378.0 | 10.40 |
| Ferric phosphate-chromic phosphate pigment (3/1) | 141.7 | 6.45 |
| Duraplex D-65A 70% Solids [1] dispersed 16 hours in a steel ball mill | 204.0 | 25.50 |
| Dispersion reduction: |  |  |
| Duraplex D-65A 70% solids [1] | 229.0 | 28.62 |
| Bechamine P-138-60 [2] | 56.5 | 6.57 |
| Aromatic hydrocarbon solvent | 115.0 | 15.85 |
|  | 1,124.2 | 100.29 |

[1] Duraplex, trademark of Rohm and Haas Co. for oil-modified alkyd resins.
[2] Bechamine, trademark of Reichhold Chemicals, Inc. for urea-formaldehyde and melamine resin solutions.

Formula Analysis and Constants:
    Pigment Volume Concentration, percent _____ 30.8
    Weight per gallon, pounds _____ 11.5
    Viscosity, KU _____ 72
    Hegman fineness _____ 7.5

Spray application:
Viscosity, No. 4 Ford Cup seconds ____ 17
Baking Schedule (° F) _____ 30' at 350
Dry Film Thickness (mil.) _____ 0.9–1.0

The alkyd primer containing the pigment composition of this invention shows better anticorrosion properties when sprayed on clean iron and steel than the same alkyd primer formulated with a commercially available VVF grade of metallic brown or a pure red oxide pigment.

Example II

The alkyd automotive primer of Example I was sprayed on steel panels and subjected to 1000 hours of a salt fog atmosphere. A control primer wherein the ferric pigment composition was replaced with a commercial iron oxide pigment was also tested. The baked panels were scored before testing. After testing the lower half of each panel was stripped of paint to determine the degree of protection the primer afforded the steel substrate. Creepage was determined as the distance from the score that rust had penetrated.

ALKYD AUTOMOTIVE PRIMER

| Primer | Topcoat [1] | Blistering, percent | Rusting, percent | Creepage, inch |
|---|---|---|---|---|
| Control | None | 90 | 90 | 1/2 |
| Test | None | 70 | 30 | 1/8 |
| Control | Yes | 0 | 0 | 1/4 |
| Test | Yes | 0 | 0 | 1/8 |

[1] Black automotive enamel.

These tests indicate the pigment composition of this invention gives better anticorrosion properties to coatings than commercial iron oxide pigments in the same coating formulations.

Example III

Following the procedure of Example I, five batches of pigments were prepared with the exception that the amount of aqueous sodium hydroxide was varied to give a range of pH values in the final mixture. These values and the chemical composition of the final product are shown in Table I below.

TABLE I

| Run | No. 1 | No. 2 | No. 3 | No. 4 | No. 5 |
|---|---|---|---|---|---|
| Final pH analysis (percent) | 1.5 | 2.0 | 3.25 | 4.6 | 7.2 |
| $Fe_2O_3$ | 29.80 | 28.67 | 28.04 | 27.70 | 26.72 |
| $Cr_2O_3$ | 9.60 | 9.30 | 9.00 | 8.80 | 8.50 |
| $Na_2O$ | 0.98 | 2.21 | 3.94 | 5.58 | 13.10 |
| $P_2O_5$ | 38.69 | 39.37 | 36.89 | 37.50 | 34.50 |
| Moisture | 3.52 | 4.36 | 6.48 | 5.30 | 4.50 |
| Loss on ignition | 17.00 | 15.40 | 14.75 | 14.30 | 12.04 |

Example IV

The five pigment compositions of Example III were each added to a long oil alkyd raw linseed oil vehicle system pigmented with one pound per gallon of the composition, three pounds per gallon of magnesium silicate extender and two pounds per gallon of pure rutile titanium dioxide. In addition to the test formulations, white iron phosphorus pigment and basic lead phosphite pigment containing formulations were prepared for comparison purposes. Each of the coating formulations, 5 test runs and 2 control runs, was sprayed on Bonderized steel panels and on mild steel panels at 1½ mil dry film thickness. The panels were air dried for 10 days, scored and given 200 hours exposure in 5% salt fog atmosphere.

The test results on the Bonderized steel panels showed that compositions No. 4 and No. 5 of Example III, containing respectively, 5.58% and 13.10% $Na_2O$ were slightly better than compositions No. 1, No. 2 or No. 3. The performance of No. 4 and No. 5 were equivalent to that of the control having white iron phosphorous as the anticorrosion pigment but not quite as good as the control having basic lead phosphite as the anticorrosion pigment.

The results of the tests on mild steel panels were the same as on the Bonderized steel panels. Test formulations No. 4 and No. 5 were similar to the results obtained with the white iron phosphorus control but not as good as that obtained with the basic lead phosphite control.

These results show that the inexpensive amorphous compositions of this invention are useful as anticorrosion pigments and give results comparable to those obtained with the more expensive commercial white iron phosphate pigment.

Example V

An epoxy ester automotive primer surfacer is prepared by adding the anticorrosion pigment composition No. 1 of Example III to the coating formulation below in the amount indicated:

| Mill charge: | Pounds |
|---|---|
| Barytes | 254.0 |
| Talc | 51.3 |
| Epotuf 6406-60[1] | 132.0 |
| Aromatic hydrocarbon solvent | 120.7 |
| Pigment Composition No. 1 (Ex. III) | 114.0 |

Dispersed 16 hours in a steel ball mill.

| Dispersion reduction: | |
|---|---|
| Epotuf 6406-60 | 192.0 |
| Beckamine P-138-60[2] | 43.7 |
| Aromatic hydrocarbon solvent | 176.0 |
| | 1086.7 |

[1] Epotuf is a trademark of Reichhold Chemicals, Inc., for epoxy ester resin solutions.
[2] Beckamine is a trademark of Reichhold Chemicals, Inc. for urea-formaldehyde and melamine resin solutions.

When this coating formulation is sprayed on steel panels, it inhibits corrosion of the metal.

Similar results are obtained when the pigment compositions No. 2, No. 3, No. 4 and No. 5 of Example III are substituted for No. 1.

Example VI

A vinyl shop coat primer is prepared by adding anticorrosion pigment composition No. 4 of Example III to the coating formulation below in the amount indicated.

| Ingredients: | Pounds |
|---|---|
| Disperse in a pebble mill: | |
| Triton X–100[1] | 2.00 |
| Pigment composition No. 4 (Ex. III) | 100.00 |
| Barytes | 60.00 |
| Mica, 325 mesh | 50.00 |
| Talc | 154.00 |
| Wollastonite | 20.00 |
| Ammonium hydroxide | 2.50 |
| Water | 200.00 |
| R&R 551[2] | 10.00 |
| Add to the dispersed mixture: | |
| Synthemul 1505[3] | 280.00 |
| Wallpol 9304[4] | 65.00 |
| Cobalt cyclodex[5] (5%) | 3.35 |
| Manganese cyclodex[5] (5%) | 3.35 |
| Water | |
| PAM 200 solution[6] (5%) | 120.00 |
| Ethylene glycol | 15.00 |
| | 1123.20 |

[1] Triton, trademark of Rohm and Haas Co. for surfactants.
[2] R & R 551, trademark of Ross and Rowe Co., for water-dispersible lecithin.
[3] Synthemul, trademark of Reichhold Chemicals, Inc., for alkyd emulsions.
[4] Wallpol, trademark of Reichhold Chemicals, Inc. for polyvinyl acetate emulsions.
[5] Cyclodex, trademark of Neodex Products Co., for emulsifiable catalysts.
[6] PAM, trademark of American Cyanamid Co. for cellulosic thickeners.

When this coating formulation is applied to steel panels, it inhibits corrosion of the metal.

Similar results are obtained when the pigment compositions of Example I, No. 1, No. 2, No. 3 and No. 5 of Example III are substituted for No. 4.

Example VII

An acrylic highway maintenance enamel is prepared by adding anticorrosion pigment composition No. 5 of Example III to the coating formulation below in the amount indicated.

Pebble mill, grind: Pounds
- Pigment composition No. 5 (Ex. III) _____ 138.3
- Acryloid B–72 (40% in toluene)[1] _____ 113.2
- Xylene _____ 15.5

Mix with:
- Acryloid B–72 (40% in toluene) _____ 352.5
- Vinylite VMCH (20% in MIBK)[2] _____ 103.6
- Methyl isobutyl ketone _____ 74.8
- Xylene _____ 74.8

872.7

[1] Acryloid, trademark of Rohm and Haas Company for acrylic resins.
[2] Vinylite, trademark of Union Carbide Corporation for vinyl resins.

When this coating formulation is applied to steel surfaces, it inhibits corrosion of the metal.

Example VIII

A railroad car primer is prepared by adding anticorrosion pigment composition No. 5 of Example III to the coating formulation below in the amount indicated.

Ingredients: Pounds
- Pigment composition No. 5 (Ex. III) _____ 100
- Zinc yellow pigment _____ 250
- Zinc oxide _____ 160
- Magnesium silicate _____ 60
- Varnish (50% solids) _____ 450
- Mineral spirits _____ 180

1200

When this coating is applied to steel surfaces, it inhibits corrosion of the metal.

Example IX

An anti-fouling shipbottom paint is prepared by adding anticorrosion pigment composition No. 4 of Example III to the coating formulation below in the amount indicated.

Ingredients: Pounds
- Zinc oxide _____ 210
- Pigment composition No. 4 (Ex. III) _____ 80
- Cuprous oxide _____ 425
- Mercuric oxide _____ 21
- Talc _____ 21
- Rosin _____ 265
- Coal tar (80% non-volatile) _____ 80
- Pine oil _____ 42
- Mineral spirits _____ 135
- High flash naphtha _____ 135

1473

When the coating is applied to steel surfaces, it inhibits corrosion of the metal.

Example X

When, in the process of Example I for ferrous sulfate, there is substituted ferrous acetate, ferrous bromide, ferrous chloride, ferrous ferricyamide, ferrous sulfate, ferrous thiocyanate or ferrous thiosulfate, pigment compositions having anticorrosion properties when included in coating systems are obtained.

Similarly, when for sodium dichromate in the process of Example I, there is substituted chromium trioxide, ammonium chromate, ammonium dichromate, sodium chromate, sodium dichromate, lithium chromate, lithium dichromate, potassium chromate or potassium dichromate, pigment compositions having anticorrosion properties when included in coating systems are obtained.

What is claimed is:

1. A process for producing an amorphous pigment composition which comprises reacting a soluble ferrous salt with sufficient soluble chromate salt to oxidize substantially all of the ferrous ions to ferric ions, in aqueous acid solution of pH from about 1 to 3 containing phosphate ions, and at temperatures from about room temperature to 100° C., and theaerfter adjusting the final pH of the mixture with sodium hydroxide to a value higher than the pH at which the reaction was run and from about 1.5 to 8.

2. The process of claim 1 wherein the final pH is adjusted to from about 3 to 8 with sodium hydroxide.

3. The process of claim 1 wherein the soluble ferrous salt and the soluble chromate salt are reacted at a temperature of from about 50° C. to 90° C.

4. The process of claim 1 wherein the soluble ferrous salt is ferrous sulfate and the soluble chromate salt is sodium dichromate.

5. An anticorrosion pigment composition consisting of from about 18 to 21 weight percent iron in the ferric state, from about 6 to 7 weight percent chromium in the chromic state, from about 0.7 to 10 weight percent sodium, from about 15 to 16 weight percent phosphorus, oxygen and from about 16 to 21 weight percent water of hydration.

References Cited

UNITED STATES PATENTS 1,651,694   12/1927   Green et al.
2,227,928   1/1941   Drucker.
2,749,214   6/1956   Eickoff et al.

DONALD J. ARNOLD, *Primary Examiner.*

L. HAYES, *Assistant Examiner.*

U.S. Cl. X.R.

106—14, 253, 304; 117—132; 252—387; 260—40